R. EICKEMEYER.

Sewing Sweat Linings into Hats.

No. 9,322. Reissued July 27, 1880.

Witnesses:
Philip F. Larner.
Howell Barth.

Inventor:
Rudolf Eickemeyer
By Wm. C. Rose
Attorney.

N. PETERS, PHOTO-LITHOGRAPHER, WASHINGTON, D. C.

UNITED STATES PATENT OFFICE.

RUDOLF EICKEMEYER, OF YONKERS, NEW YORK.

SEWING SWEAT-LININGS INTO HATS.

SPECIFICATION forming part of Reissued Letters Patent No. 9,322, dated July 27, 1880

Original No. 58,622, dated October 9, 1866. Application for reissue filed June 24, 1880.

*To all whom it may concern:*

Be it known that I, RUDOLF EICKEMEYER, of Yonkers, in the county of Westchester and State of New York, have invented a new and Improved Mode of Sewing the Sweat-Linings into Hats; and I do hereby declare that the following is a full, clear, and exact description of the same, reference being had to the accompanying drawings, forming part of this specification, in which—

Figure 1:
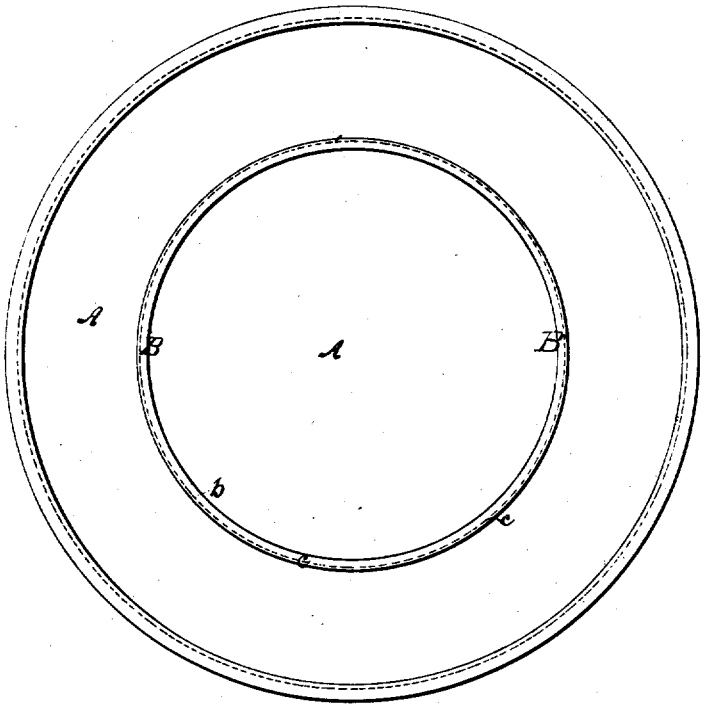
Figure 2:
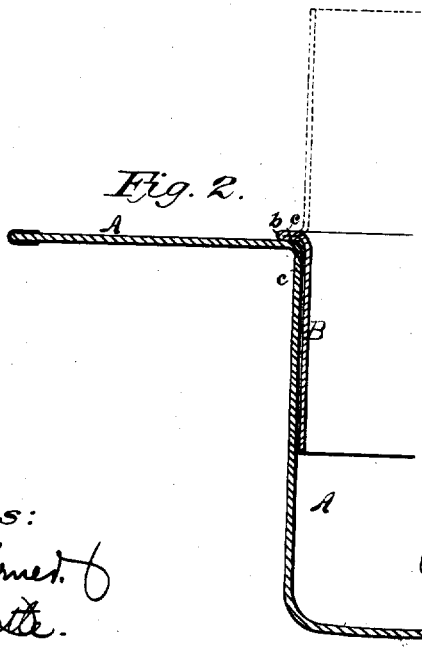

Figure 1 is an inverted view of a hat having my invention applied. Fig. 2. is an inverted vertical sectional view of one side of the hat on a larger scale than Fig. 1.

Similar letters of reference indicate corresponding parts in both figures.

The method heretofore commonly practiced of sewing in the sweat-linings into soft hats is by stitches passing directly through the hat from the inside to the outside, and whipped over the edge of the band or angle between the brim and sides of the hat. This is liable to two serious objections, viz: first, it has been a fruitful cause of the staining of the exterior of what is termed the "band" of the hat—that is to say, the part immediately above the brim—with perspiration, which is conveyed by the capillarity of the sewing-thread from the inside of the hat to that portion of the outside in the angle between the brim and sides, where it is difficult to cover it with the ribbon; second, when the thread is whipped over the edge of the lining through the band or angle between the brim and sides of the hat, as heretofore, the thread thus whipped over soon cuts or tears its way into the felt, (especially in soft hats,) and thereby destroys the sharpness of the band or angle between the brim and sides of the hat.

One object of my invention is to prevent the perspiration from being thus conducted by the thread to the exterior of the hat, and another object is to make the thread which secures the lining into the hat preserve the sharpness of the angle between the brim and sides which is so essential to a good appearance of the hat. With a view to the attainment of these results, I secure the lining to the hat by means of a single line of stitches, which pass through the outer edge of the lining and through the hat-body diagonally across the angle between the under surface of the brim and the interior surface of the side, without passing twice through the exterior of the hat-body and without being whipped over the edge of the lining, as heretofore.

To enable others skilled in the art to apply my invention to use, I will proceed to describe it with reference to the drawings.

A denotes the body of the hat, and B the sweat-lining. As clearly shown in the drawings, the lining has its lower or outer edge doubled or turned inward upon itself, and this doubled portion is also turned outward, so as to extend over upon the brim of the hat, as seen at *b*, Figs. 1 and 2. The lining is turned inside out, in the usual manner; but instead of having its edge inserted within the body of the hat, as heretofore, its lower doubled edge is laid upon the surface of the under side of the brim adjacent to the angle between the brim and sides, as shown in Fig. 2, in which the position of the lining is also indicated by dotted lines. The stitching in is performed while the lining is thus turned inside out and resting upon the brim, after which it is turned downward into the hat, as shown in Fig. 2.

The stitches *c c*, by which the sewing in is performed, pass right through the turned-in portion of the lining and diagonally through the angle between the brim and sides of the hat-body, as shown in Fig. 2, without passing through the exterior surface of the hat. This sewing may be performed by either a single-thread or a double-thread machine having any of the well-known stitch-making contrivances, with a properly-arranged work-plate, upon which the hat is supported in a position for the needle to pass through the hat-body diagonally to the brim and sides.

It may be readily understood that the stitches *c c*, passing through the angle of the brim and sides of the hat, as represented in Fig. 2, will give firmness to and tend to preserve the shape of that part of the hat.

I am aware that it is not new to sew the lining into the hat by stitches passing diagonally through the angle of the band, as that is done by the sewing-machine which is the subject of my Letters Patent No. 25,078; but in this machine the thread is either whipped over the edges of the lining, making a rough edge, or is taken through the lining at two different points, which is very objectionable. In view, however, of these methods of sewing, I cannot here claim, broadly, the sewing in of the lining by stitches passing diagonally through the band of the hat.

I am also aware that it is not new to cover and protect from contact with the head the line of stitches by which a lining is secured to a hat by the interposition of the main portion of the lining between the stitches and the head of the wearer, for such method is exhibited in the United States Letters Patent to B. W. Fay, September 2, 1862, No. 36,344; but

What I claim as new and of my own invention is—

1. The improvement in securing sweat-linings into hats, substantially as hereinbefore described, by a single line of stitches through an outwardly-extended lower edge of the lining and through the hat-body.

2. The improvement in stitching sweat-linings into hats, substantially as hereinbefore described, which consists in the application of a single line of stitches through an outwardly-extended lower edge of the lining and diagonally through the brim and sides of the hat.

3. A sweat-lining in a hat extended at its lower edge over and upon the brim and secured in position, substantially as described, by a line of stitching protected against contact with the head of the wearer by the interposition of the main portion of the lining between the head and said line of stitching.

4. A sweat-lining in a hat, substantially as hereinbefore described, having a doubled lower edge extended over and upon the brim and secured to the hat in that position.

RUDOLF EICKEMEYER.

Witnesses:

PHILIP F. LARNER,
HOWELL BARTLE.